United States Patent [19]

Grady et al.

[11] Patent Number: 4,779,473

[45] Date of Patent: Oct. 25, 1988

[54] GIMBAL APPARATUS FOR TRANSLATING ROTATIONAL MOTION TO ACCURATE LINEAR MOTION

[75] Inventors: Robert J. Grady, Redwood City; Rolf D. Kahle, Saratoga; Michael H. Ranger, San Jose; Semyon Spektor, San Francisco; Michael Veprinsky, San Jose, all of Calif.

[73] Assignee: NCR Corporation, Dayton, Ohio

[21] Appl. No.: 56,170

[22] Filed: Jun. 1, 1987

[51] Int. Cl.$^4$ .................. F16H 25/22; B23Q 23/00
[52] U.S. Cl. ........................ 74/89.15; 74/424.8 R
[58] Field of Search .................. 74/89.15, 424.8 R

[56] References Cited

U.S. PATENT DOCUMENTS

| 3,745,840 | 7/1973 | Guralick | 74/89.15 |
| 3,977,262 | 8/1976 | Randolph | 74/89.15 |
| 4,302,981 | 12/1981 | Wayman | 74/89.15 |
| 4,372,222 | 2/1983 | Tice | 74/424.8 R |
| 4,372,223 | 2/1983 | Iwatani | 74/89.15 |
| 4,530,251 | 7/1985 | Henle | 74/424.8 R |
| 4,597,303 | 7/1986 | Nakaya | 74/89.15 |

FOREIGN PATENT DOCUMENTS

| 3623112 | 1/1987 | Fed. Rep. of Germany | 74/89.15 |
| 156625 | 9/1982 | German Democratic Rep. | 74/89.15 |
| 752078 | 7/1980 | U.S.S.R. | 74/89.15 |

Primary Examiner—Lawrence Staab
Attorney, Agent, or Firm—Wilbert Hawk, Jr.; Edward Dugas

[57] ABSTRACT

A lead screw driven by a motor has a drive nut threadably connected to the lead screw for reciprocation therealong. The drive nut is rotationally restrained thereby limiting its movement along the axis of the lead screw. Three disk members each having an opening through their centers are positioned on the lead screw. The two outer disk members each have at least a pair of bearing members, such as ball bearings, positioned along a diameter of the disk on adjacent sides of the opening. A keeper member is positioned on the lead screw to sandwich the three disk members between the drive nut and the keeper member. Indexing members are positioned on the drive nut and the keeper member to maintain the diameters of the two outer disks, having the bearings mounted therein, orthogonal with respect to each other. A linear motion device is rigidly coupled to the keeper member such that rotary motion of the lead screw is translated to the linear motion device without flexure, eccentricities, or other undesirable movement of the lead screw being transmitted to the linear motion device.

11 Claims, 2 Drawing Sheets

GIMBAL APPARATUS FOR TRANSLATING ROTATIONAL MOTION TO ACCURATE LINEAR MOTION

BACKGROUND OF THE INVENTION

The present invention is related to devices for translating rotational motion to linear motion using a lead screw with a drive nut threadably connected to the lead screw and more particularly to a device for isolating the eccentricities of the lead screw from the linear motion of a device driven off of the drive nut. A patent of interest for its showing of the state of the art is U.S. Pat. No. 3,977,262, entitled "Drive Mechanism For A Carriage" by J. E. Randolph, wherein there is disclosed a nut that is mounted on a lead screw and is constrained from rotational movement, and a mounting assembly which couples the nut to a linearly moveable carriage. The drive nut is loosely coupled to the mounting assembly so that it may be skewed by the eccentricities of the lead screw without binding on the lead screw. A spring is used to urge the nut against the mounting assembly to dampen bounce forces.

Another patent of interest is U.S. Pat. No. 4,530,251, entitled "Apparatus For Transmitting Motion To Work-Supporting Tables of Machine Tools And The Like", by K. Henle, wherein a non-rotating nut assembly is driven by a lead screw and is connected to a movable work carriage by a pair of links that are pivotly mounted, at one end, to the nut assembly, and at the other end to the movable work carriage to isolate flexures of the lead screw from the movable work carriage.

Yet another patent of interest is U.S. Pat. No. 4,597,303, entitled "Drivably Connecting Construction In Measuring Instrument" by T. Nakaya, wherein there is disclosed a non-rotating nut that is driven by a lead screw with the nut loosely coupled to a movable main member by a plurality of regularly spaced ball bearings such that the nut is provided with limited movement perpendicular to the long axis of the lead screw while being rigidly constrained to the movable main member along the long axis of the lead screw.

The accuracy requirements for a system which records information onto microfilm aperture cards, in the form of lines of data, is extremely high. Each line must be equally spaced otherwise the distortion will be clearly evident when the microfilm is viewed through a viewer, which, for example, magnifies the viewed area by a factor of 30 to 1.

When high resolution dot printing is used to create images, there are six thousand scans per inch with six thousand dots possible along each scan line. Accuracy of the spacing of these lines is therefore extremely important. The present invention provides that necessary degree of accuracy.

SUMMARY OF THE INVENTION

The present invention is directed to a gimbal apparatus for translating rotational motion to linear motion while isolating the eccentricities associated with the rotational motion device from the linear motion device.

In a preferred embodiment of the invention an elongated lead screw is driven by a motor for imparting rotational motion. A drive nut is threadably connected to the lead screw and is restrained from rotational motion around the lead screw such that rotation of the lead screw is translated to a linear motion in the drive nut. Also provided is a pair of outer disk members and a central disk member, each having a central opening for receiving the elongated lead screw and each positioned on the elongated lead screw adjacent the drive nut. Each of the outer disk members is provided with two bearing members positioned along a defined diameter of the disk members. A keeper means sandwiches the three disk members between the drive nut and the keeper means. An indexing means maintains the defined diameters of the two outer disks orthogonal with respect to each other. Eccentricities of the lead screw, from all sources, are not transmitted to the drive nut and only pure linear motion is imparted to the keeper means. A linear motion device such as an aperture card carriage is ridigly affixed to the keeper means such that the linear motion of the drive nut is transmitted through the disk members to the keeper means without the eccentricities of the lead screw.

From the foregoing, it can be seen that it is a primary object of the present invention to isolate nonlinear motions of the lead screw from a linear motion device.

It is another object of the present invention to provide a gimbaling apparatus which translates linear motion while isolating all other motions.

These and other objects of the present invention will become more apparent when taken in conjunction with the following description and drawings throughout which like characters indicate like parts and which drawings form a part of the present disclosure.

DESCRIPTION OF THE PREFERRED EMBODIMENT

Figure 1:
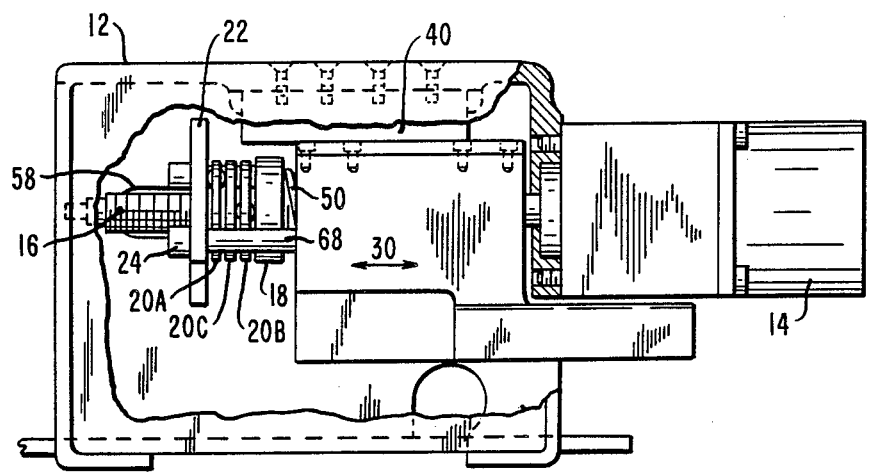
FIG. 1 is a side view, partially cut away, of a fixed housing assembly wherein is mounted a linear motion device driven by the gimbal assembly of the present invention.

Referring to FIG. 1, a fixed housing 12 supports a slide type bearing 40 which in turn is attached to a linear motion device such as an aperture card holder carriage 30, which carriage reciprocates in a left and right direction (as indicated by the direction arrows) under control of a motor 14 and a lead screw 16. A collar 18 is threadably connected to a drive nut 45 (shown in FIG. 2) and to the lead screw 16 and is restrained from rotational motion around the lead screw by a retaining arm 52 (shown in FIG. 3) extending through a notched opening 58 in the fixed housing 12. A pair of outer disk members 20A and 20B are positioned on the lead screw on either side of a central disk member 20C. A keeper member 22 sandwiches the three disk members between the drive nut collar 18 and the keeper member 22. A pair of bolts 24 extend through the keeper member 22 and a pair of spacing ferrules 68 to rigidly attach the keeper member 22 to the aperture card holder carriage 30. A spring 50 maintains a pressure between the carriage 30 and the drive nut collar 18.

Figure 2:
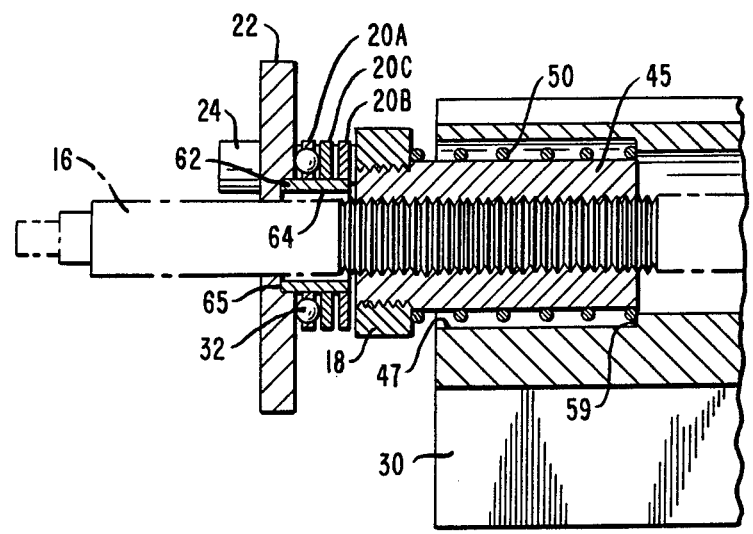
FIG. 2 is an enlarged sectioned view of the gimbal assembly of FIG. 1 mounted to a lead screw.
Figure 3:
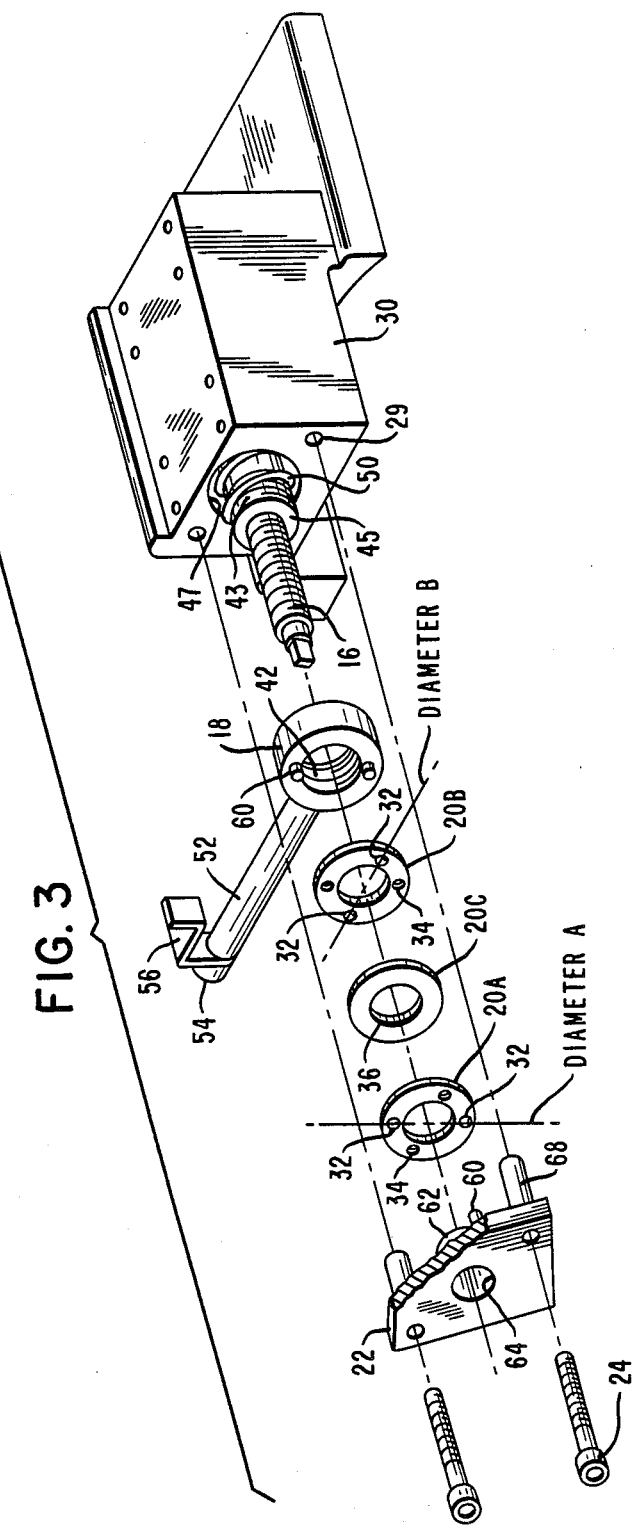
FIG. 3 is an exploded view of the gimbal assembly of the present invention with the linear motion device removed from the fixed housing assembly of FIG. 1.

Referring now to the exploded, detailed, view of FIG. 3, in conjunction with the enlarged sectioned view of FIG. 2; the carriage 30 is shown separated from the fixed assembly 12 and the slide bearing 40 for the purpose of clarity. Centrally positioned through the carriage 30 is a bore 47 through which the threaded lead screw 16 passes. Mounted to the lead screw 16 is the threaded drive nut 45 which is adapted to receive the collar 18 via threads 42 and 43. When the collar 18 is threaded to the end of the drive nut 45 it forms a retainer for the spring 50 which at one end abuts the collar 18 and at the other end abuts an inward projecting lip 59 formed in the central bore 47. The collar 18 has projecting therefrom the retaining arm 52 which fits through the notch 58, shown in FIG. 1, for preventing the rotation of the drive nut 45 around the axis of the lead screw 16. A ball bearing 54 may be attached to the end of the retaining arm 52 to minimize the rubbing friction between the arm 52 and the notched opening 58. A flag member 56, is used in conjunction with photodetectors, not shown, for the purpose of providing position information as to the position of the carriage 30 in the fixed housing 12. The collar 18 is provided with two indexing members 60, the function of which will be discussed in conjunction with the outer disk members 20A and 20B. The third disk member 20C, along with the disk members 20A and 20B are provided with central bores 36 for positioning on the bushing 62. The outer two disk members 20A and 20B have bearing members 32 positioned along DIAMETER A and DIAMETER B, respectively. Such bearing members 32, in the preferred embodiment, are ball bearings.

Each of the bearings 32 extends through the respective disk members so as to project from the disk members on opposite sides thereof. The central disk member 20C does not contain any bearing members and is formed of a hardened material so as to provide a substantially noncompressible compression surface for the balls 32.

The keeper member 22 is provided with a central bore 64 and with a cylindrical bushing 62 that is press fit into a recess 65, in the keeper member 22. A pair of indexing means 60 project from the surface of the keeper member 22 facing towards the carriage 30. The rigid ferrules 68 extend from the same surface and in conjunction with Allen screws 24 are designed to rigidly attach the keeper member 22 to the carriage 30 via a pair of tapped holes 29.

In the assembled system, the keeper 22 sandwiches the three disk member 20A through 20C, on the bushing 62, against the collar 18. The indexing means 60 on the collar 18 are adapted to mate with indexing openings 34 in the disk member 20B. In a like manner, the indexing members 60, projecting from the keeper member 22, are adapted to mate with the indexing openings 34 in the disk member 20A. The indexing means on the collar 18 and the keeper 22 are orientated orthogonal with respect to each other so as to maintain the DIAMETER A and the DIAMETER B, along which the balls 32 are mounted to the disk members 20A and 20B, respectively, in a mutually orthogonal position. This configuration provides a gimbal structure that permits disk member 20A to rotate about an axis defined by DIAMETER A while also permitting the disk member to roll in any direction transverse to the long axis of the lead screw. Identical degrees of freedom are possible with disk member 20B about an axis defined by DIAMETER B.

In operation, as the lead screw 16 is rotated, the drive nut 45 and collar 18 linearly move along the axis of the lead screw 16 in a direction which is dependent upon the direction of rotation of the lead screw. As the drive nut 45 moves along the lead screw 16, various eccentricities in the lead screw 16 may cause the drive nut 45 to move in directions generally transverse to the axis of the lead screw and to suffer angular displacements between the axis of the lead screw and the radial plane of the nut center. Such being the case, the drive nut 45 and collar 18 are prevented from transmitting that motion to the keeper assembly 22 and in turn to the carriage 30 by means of the balls 32 since the balls will move along the surface plane of the central disk member 20C. Canting motion of the drive nut 45, in a like manner, will not be transmitted to the keeper member 22 due to the fact that the balls 32 positioned on the DIAMETER A and the DIAMETER B are held mutually orthogonal with respect to each other, thereby providing a gimbaling type action. The only motion that can be transmitted to the keeper assembly 22 by the lead screw 16 is that motion which causes a compression of the balls. Compression of the balls is caused by the linear motion of the drive nut 45 and the collar 18 along the axis of the lead screw 16. When the drive nut 45 is moving in the leftward direction, the collar 18 is directly exerting a compression force onto the balls 32, which compression force is transmitted to the keeper member 22. When the drive nut 45 is moving to the right, the collar 18 is being pressed against the ball bearings 32 by the spring 50 transmitting a force to the carriage 30, which force is in turn transmitted to the ferrules 68 and to the pair of bolts 24 and in turn to the keeper member 22. The spring 50 is selected in strength and length so that the force exerted thereby is sufficient to maintain the carriage 30 in direct contact with the drive nut, via the plate 22, balls 32 and collar 18 when shock and vibration are applied to the fixed assembly 12. The strength is selected so as to substantially exeeed expected "g" forces.

If desired, the one piece drive nut 45 may be replaced with an anti-backlash nut of the two piece type manufactured by Bolt-Screw and Actuators of San Jose, Calif. specifically for use with lead screws.

While there has been shown what is considered to be the preferred embodiment of the inventon, it will be manifest that many changes and modifications may be made therein without departing from the spirit and scope of the invention. It is intended, therefor, in the annexed claims, to cover all such changes and modifications that may fall within the true scope of the invention.

We claim:

1. An apparatus for translating rotational motion to linear motion comprising:
   an elongated lead screw;
   motor means coupled to said lead screw for imparting rotational motion thereto;
   a drive nut threadably connected to said lead screw and restrained from rotational motion around said lead screw;
   a pair of outer disk members and a central disk member each having a central opening for receiving said elongated lead screw, each positioned on said lead screw adjacent said drive nut, each of the outer disk members having bearing means positioned along a defined diameter of the disk member;
   a keeper means for compressing the three disk members between the drive nut and said keeper means; and means for maintaining the defined diameters of the two outer disk members orthogonal with respect to each other, said means for maintaining including indexing members projecting from said drive nut and said keeper means and extending into indexing openings in the outer disk members.

2. Means for converting a rotational movement of a lead screw into linear movement of an aperture card holder along the axis of the lead screw comprising:

a fixed housing assembly;

a threaded lead screw;

a carriage of the type for temporarily holding an aperture card;

means for slidably mounting said carriage to permit said carriage to linearly move back and forth in said fixed housing assembly;

a motor supported at said fixed housing assembly for rotating said threaded lead screw;

a drive nut threaded on said lead screw and restricted to movement along the axis of said lead screw;

three members each having an opening through its center positioned on said lead screw abutting said drive nut, the outer two members each having an orthogonal diameter consisting at least one set of balls;

a keeper means rigidly connected to said carriage for sandwiching said three members against said drive nut so that the linear motion of said drive nut is transmitted to said carriage;

indexing means extending from each of said drive nut and said keeper means; and an indexing opening in each of the outer members for receiving said indexing means in order to maintain the diameters of the two outer members orthogonal with respect to each other.

3. The converting means according to claim 2 wherein said carriage has a central bore for receiving said lead screw, wherein said drive nut has an extension thereon extending into said central bore, and wherein said converting means further comprises a spring mounted in coaxial relationship with said lead screw and compressed against said drive nut and said carriage.

4. The converting means according to claim 2, wherein said converting means further comprises a retaining arm extending from said drive nut in a direction transverse to the axis of said lead screw, the distal end of said retaining arm supported for sliding movement in a direction parallel to axis of said lead screw in order to restrict rotation of said drive nut.

5. The converting means according to claim 4, wherein said drive nut includes a collar adjacent said three members and from which said indexing means and said retaining arm extend.

6. The converting means according to claim 2, wherein said indexing means comprises two pin-like indexing members, said indexing members on said drive nut being arranged orthogonally in relation to said indexing members on said keeper means.

7. A gimbal apparatus for translating rotational motion to linear motion comprising:

a lead screw;

a drive nut threadably connected to said lead screw, said drive nut restrained from rotating around said lead screw;

two outer disk members each having a diameter along which is mounted bearing means projecting from both sides of the disk members, each of the outer disk members having a central bore for receiving said lead screw;

a central disk member having a central bore for receiving said lead screw;

means for maintaining the diameter, along which is mounted the bearing means, of each outer disk member orthogonal with respect to each other; and keeper means for sandwiching the central disk member between the two outer disk members with said lead screw passing through the central bore of each disk member and with the outer disk members sandwiched between said drive nut and said keeper means such that only the linear movement of said drive nut along said lead screw is transferred to said keeper means;

said means for maintaining the diameter of each outer disk member comprising:

an indexing member on each of said keeper means and said drive nut; and an indexing opening in each of the outer disk members for mating with one said indexing member.

8. The gimbal apparatus according to claim 7 wherein said keeper means is further comprised of:

a central bore for receiving said lead screw; and a cylindrical bushing having an inner diameter opening sufficient to receive said lead screw and an outer diameter for receiving and supporting the two outer disk members and the central disk member.

9. Apparatus comprising:

a fixed frame;

a lead screw;

a movable frame for rotatably supporting said lead screw;

a reversable motor attached to said fixed frame and coupled to said lead screw;

a threaded nut mounted to said lead screw and restrained from rotation so as to permit translation along said lead screw in an axial direction;

a first member supporting at least two bearings against said threaded nut along a first axis on opposite sides of said lead screw;

an incompressible member contacting said at least two bearings opposite said threaded nut;

a second member supporting at least two bearings against said incompressible member on opposite sides of said lead screw along a second axis orthogonal to said first axis;

a keeper means for sandwiching said incompressible member between said first and said second members, and said first member against said threaded nut;

means for rigidly fastening said keeper means to said movable frame;

means for interposed between said threaded nut and said movable frame for urging said keeper member towards said threaded nut; and indexing means extending from said keeper means and said threaded nut for maintaining said first and said second members' bearings orthogonal with respect to each other, said indexing means mating with indexing openings in said first and second members.

10. The apparatus according to claim 9 wherein said first and second members are washer like in shape and wherein said at least two bearings extend through said first and second members such that a part of each bearing projects from each side of said first and said second members.

11. The apparatus according to claim 10 wherein said at least two bearings are balls.

* * * * *

UNITED STATES PATENT AND TRADEMARK OFFICE
CERTIFICATE OF CORRECTION

PATENT NO. : 4,779,473

DATED : October 25, 1988

INVENTOR(S) : Robert J. Grady et al.

It is certified that error appears in the above-identified patent and that said Letters Patent is hereby corrected as shown below:

Column 5, line 24, delete "consisting" and substitute --containing--.

Signed and Sealed this

Twenty-first Day of March, 1989

Attest:

DONALD J. QUIGG

Attesting Officer

Commissioner of Patents and Trademarks